Patented Aug. 7, 1928.

1,680,107

UNITED STATES PATENT OFFICE.

FRANK F. MARQUARD, OF CLAIRTON, PENNSYLVANIA.

PROCESS FOR PREPARING FLUE DUST FOR SMELTING IN BLAST FURNACES.

No Drawing. Application filed October 15, 1927. Serial No. 226,524.

This invention relates to the utilization of flue dust such as occurs as a result of the smelting of iron ores. More particularly the invention relates to a low cost process for preparing flue dust so it can be recharged for smelting in blast furnaces with the same general recoveries as is secured from the original iron ores.

While the process is adapted to be used in the preparation of flue dust from any ores whatever it has been found particularly valuable in the treatment of the flue dust from those ores which contain a large proportion of very fine dust, such as will pass through a one hundred mesh screen. Notable among such ores are the ores termed, from their field of discovery, Mesaba iron ores.

For many years, ever since the general use of the fine Mesaba iron ores has been common in blast furnaces in the production of pig iron, the furnace operators have been confronted with a problem that has caused great concern to the furnace management; that is, the large amount of iron losses that is sustained due to a certain percentage of the very fine ores that is being carried out of the furnace top with the gases. These fines are usually 5 to 10% richer in iron content than the iron ores themselves. This fine ore dust, which is commonly known as "flue dust", is recovered largely in the dust catchers and in settling basins of the gas washers such as are used in modern reduction plants.

This flue dust varies in degrees of fineness, the content of very fine dust ranging from 30% through 100 mesh to 95% through 100 mesh screen. In general, the flue dust from the dust catcher will have fines averaging around 40% through 100 mesh screen, especially in such operations where they do not use untreated flue dust in their burden, while the dust caught in the settling basins from the washers will be very much finer and the fine content will average around 95% through 100 mesh screen.

Numerous methods have been used to condition this flue dust for smelting, such as bricketting, clinkering, etc., which methods cost from one dollar to three dollars per ton of flue dust clinkered, not considering the losses sustained in the operation.

A few furnace operators are attempting to use this fine dust in a raw or untreated condition, and by heavy flue dust circulation are able to use up practically all the coarser grades of flue dust produced losing only the extremely fine particles. This method of using flue dust, however, is not generally considered good practice not only because of certain losses but because of the disturbing influences the very fine dust has upon the charge and general furnace reactions, resulting in irregular quality of iron and usually reduced production of iron.

It is admitted by all blast furnace operators, that the very fine ore dust passing a 100 mesh screen is not desirable for a smooth running furnace when operating at a high rate of capacity, with high gas velocities.

The various Mesaba iron ores contain varying percentages of fines. For example, Mesaba ore known as group 3 contains an average of about 17% through 100 mesh screen; group 2 contains 24% through 100 mesh screen, etc.

The average mixture of iron ore in furnaces using mostly Mesaba ores, will run about 14% through 100 mesh screen, and on the average furnace operations about 33% of the fines through a 100 mesh screen are blown out of the furnace in addition to a certain percentage of fines as large as will pass a 20 and stop on a 40 mesh screen. Thus, on the average from 250 to 400 pounds of flue dust is recovered from the furnace gases in the dust catchers and washer sumps for every gross ton of pig iron made.

These amounts vary greatly with the different methods of operating a furnace and different rates of blowing a furnace; also, on the size of furnace and character of the ores used.

Having thus described the nature of the flue dust, its fineness, its source and amount produced by the normal blast furnace operations, what I now propose to describe is my method of treating this flue dust in a manner that will alter the properties of this flue dust, in a way that will greatly reduce the amount of the very fine dust particles present, so that the treated product will contain no more and may by proper treatment contain considerably less fines passing a 100 mesh screen than is contained in the original ores or thereabouts having determined that with the reduction of these fines, the treated flue dust with its coarser grains can be recharged into the blast furnaces and because of the larger size and heavier grains, it will not again be carried out of the top of the furnace with the movement of the gases.

It is apparent then, that if I can change the properties of the dust to reduce the amount passing through a 100 mesh screen I will have altered or changed the properties of this flue dust so that it could be used in the blast furnaces and enable the blast furnace operations to proceed about as smoothly as it would on the regular Mesaba iron ores, containing a similar amount of fines that will go through a 100 mesh screen.

While this treatment is particularly applied to flue dust, it can also be used effectually in the treatment of the iron ore itself, where such ore contains a very large amount of fines.

The treatment I found to be the most effective as well as the most practical and economical, consists in mixing with the flue dust or ore containing excessive fines with the watery effluent from an ammonia liquor still, a solution commonly known as ammonia still waste liquor. This still waste liquor can be used as it comes from the still or can be concentrated and used in the concentrated form.

I have found that by wetting and mixing flue dust with ammonia still waste liquor, and then allowing it to age for a period of time, a chemical reaction of the dust with the ammonia still waste liquor will take place which will bind and cement the fine particles of dust in a manner that will greatly increase the sizes of the individual small masses, and that this treatment will coarsen up the product and reduce the amount that will pass a 100 mesh screen, to a point where the recovered material after treatment can be used successfully in a blast furnace without the necessity or cost of clinkering or further treatment. By heat treating the mixture it is possible to accelerate the reaction and speed up the aging period where time is a factor.

I have also discovered that by mixing about 10% of granulated blast furnace slag with the flue dust, in addition to the still waste liquor, we hasten the cementing action of the fine particles of flue dust upon the surfaces of the granulated slag.

This ammonia still waste liquor is a waste product produced by the distillation of free and fixed ammonia gas liquors, in combination with alkalies. The lime or soda is used to free the ammonia vapor and forms combinations with the chlorides, sulphides, cyanides, etc., contains some phenols and excess of lime. Approximately 25 gallons of the ammonia still waste liquor is produced to every ton of coke made in a by-product oven when using the direct system of ammonia recovery. Owing to the presence of phenol and tar acids in this ammonia still waste liquor, the manufacturers of by-product coke have been faced with one of the most difficult problems in the operation of a coke plant, that is to dispose of this ammonia still waste liquor. It has been definitely determined that one part of phenol in 10,000,000 parts of water can be tasted. Thus, all health authorities have prohibited the disposal of this still waste liquor with its phenol content in the streams, so that my discovery of a process in which it can be used economically is of special value to the operations of a by-product coke plant, as well as to the blast furnace operations in conditioning its flue dust, for the amount of ammonia still waste liquor produced in making the coke for a blast furnace is just about sufficient to treat the flue dust made from that blast furnace.

The following is a representative analysis of the ammonia still waste made from the coking of Pittsburgh bituminous coal:

*Approximate analysis of ammonia still waste not concentrated.*

| | Per cent. |
|---|---|
| Water | 97 to 98 |
| Calcium chloride | 1 to 2 |
| Calcium sulphide | .025 |
| Calcium sulphate | .055 |
| Lime CaO | .075 |
| Magnesium sulphate | .065 |
| Free sulphur | .040 |
| Ammonia sulphate | .060 |
| Phenol and tarry matter | .035 |
| Ammonia-sulpho-cyanates | .063 |

By adding ammonia still waste liquor to flue dust in any amount up to the point of saturation of the flue dust which is about 25%, the amount giving the best results being about 20% depending upon the percentages of salts in the still waste liquor, and storing this mixture in the open and allowing it to age for a period of time, from two to four weeks or longer, the product will change in character as follows:

Sieve test on untreated flue dust—75% passed through a 100 mesh screen.

Test on ammonia still waste liquor treated flue dust after thirty days aging—only 20% passed through a 100 mesh screen.

Having thus described the invention, what is claimed as new, is:

1. That step in the process of treating iron ore flue dust for smelting which consists in mixing ammonia still waste liquor with the flue dust.

2. The process of treating iron ore flue dust for smelting which consists in mixing ammonia still waste liquor with the flue dust and allowing the mass to age a sufficient time to produce agglomeration of the major part of the fine particles of dust into larger masses.

3. The process of treating iron ore flue dust for smelting which consists in mixing ammonia still waste liquor with the flue dust and allowing the mass to age a sufficient time to produce agglomeration of the major part of the fine particles of dust into larger masses, and applying heat during the period of aging.

4. The process of treating iron ore flue dust for smelting which consists in adding to a quantity of flue dust ammonia still waste liquor in an amount depending upon its concentration of salts, up to the saturation limit of the flue dust which runs about 25% liquor.

5. The process of treating iron ore flue dust for smelting which consists in adding to a quantity of flue dust up to 25% of ammonia still waste liquor and allowing the resultant mixture to age sufficiently to produce agglomeration of the fine particles of flue dust.

6. The process of treating iron ore flue dust for smelting which consists in adding to a quantity of flue dust different amounts up to 25% of ammonia still waste liquor, allowing the resultant mixture to age sufficiently to produce agglomeration of the fine particles of flue dust, and applying heat during the period of aging.

7. The process of treating iron ore flue dust for smelting which consists in adding to a quantity of flue dust a percentage of blast furnace slag, about 10% in a granulated form, such as is produced without further preparation in a granulated pit, and up to 25% ammonia still waste liquor, allowing the resultant mixture to age sufficiently to produce agglomeration of the fine particles of the flue dust.

8. The process of treating iron ore flue dust for smelting which consists in mixing granulated blast furnace slag with the flue dust and treating the mass with ammonia still waste liquor.

In testimony whereof I affix my signature.

FRANK F. MARQUARD.